Jan. 24, 1967   A. J. TAORMINA   3,299,510
VEGETABLE AND FRUIT PEELER
Filed May 27, 1965   2 Sheets-Sheet 2
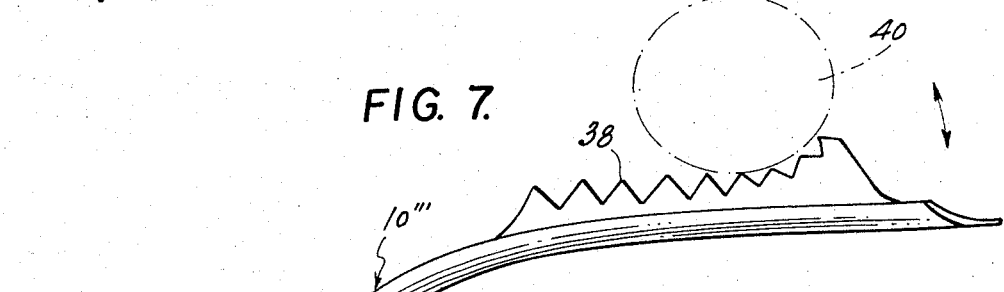
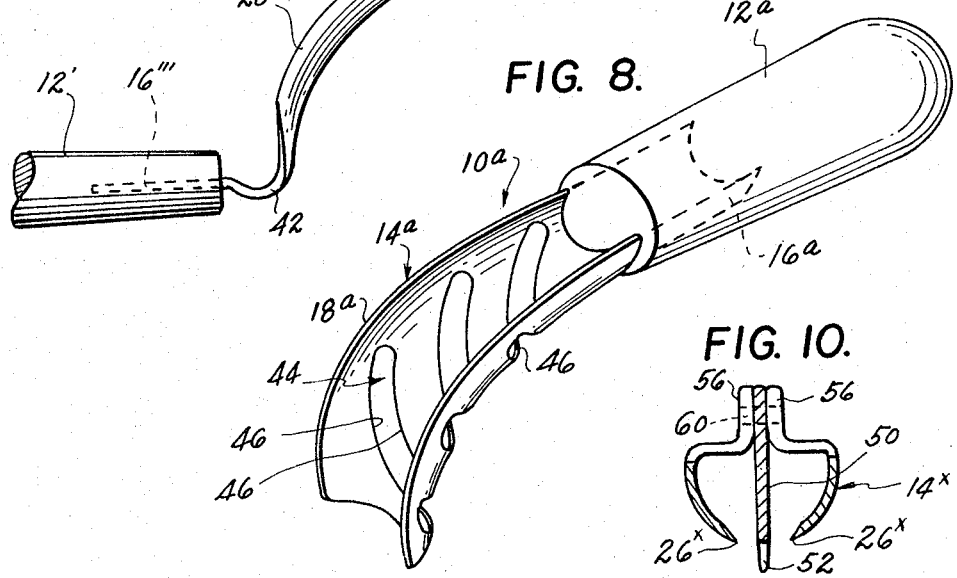
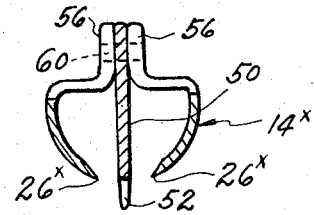
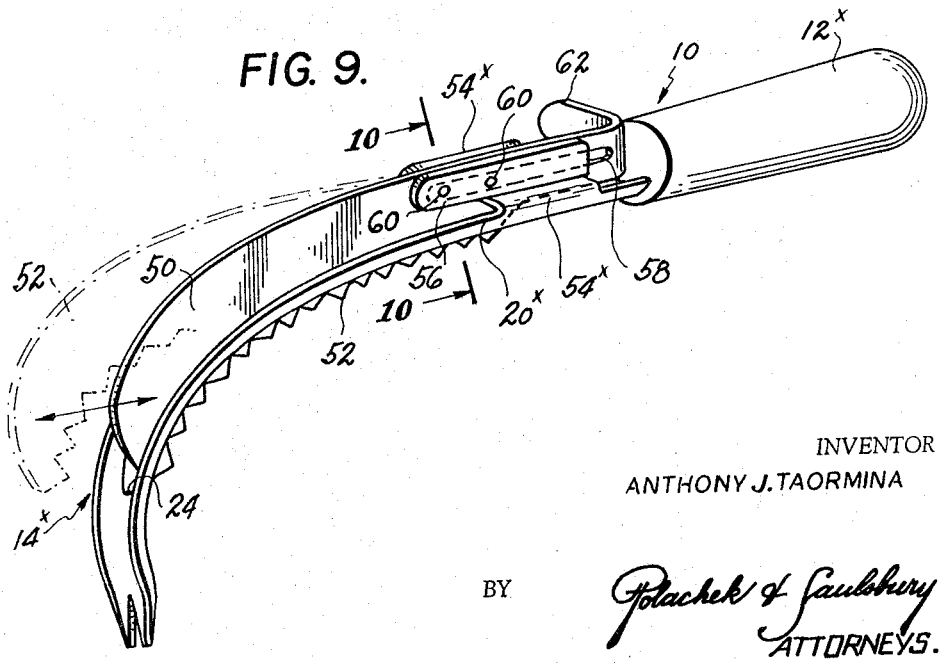
INVENTOR
ANTHONY J. TAORMINA
BY *Polachek & Saulsbury*
ATTORNEYS.

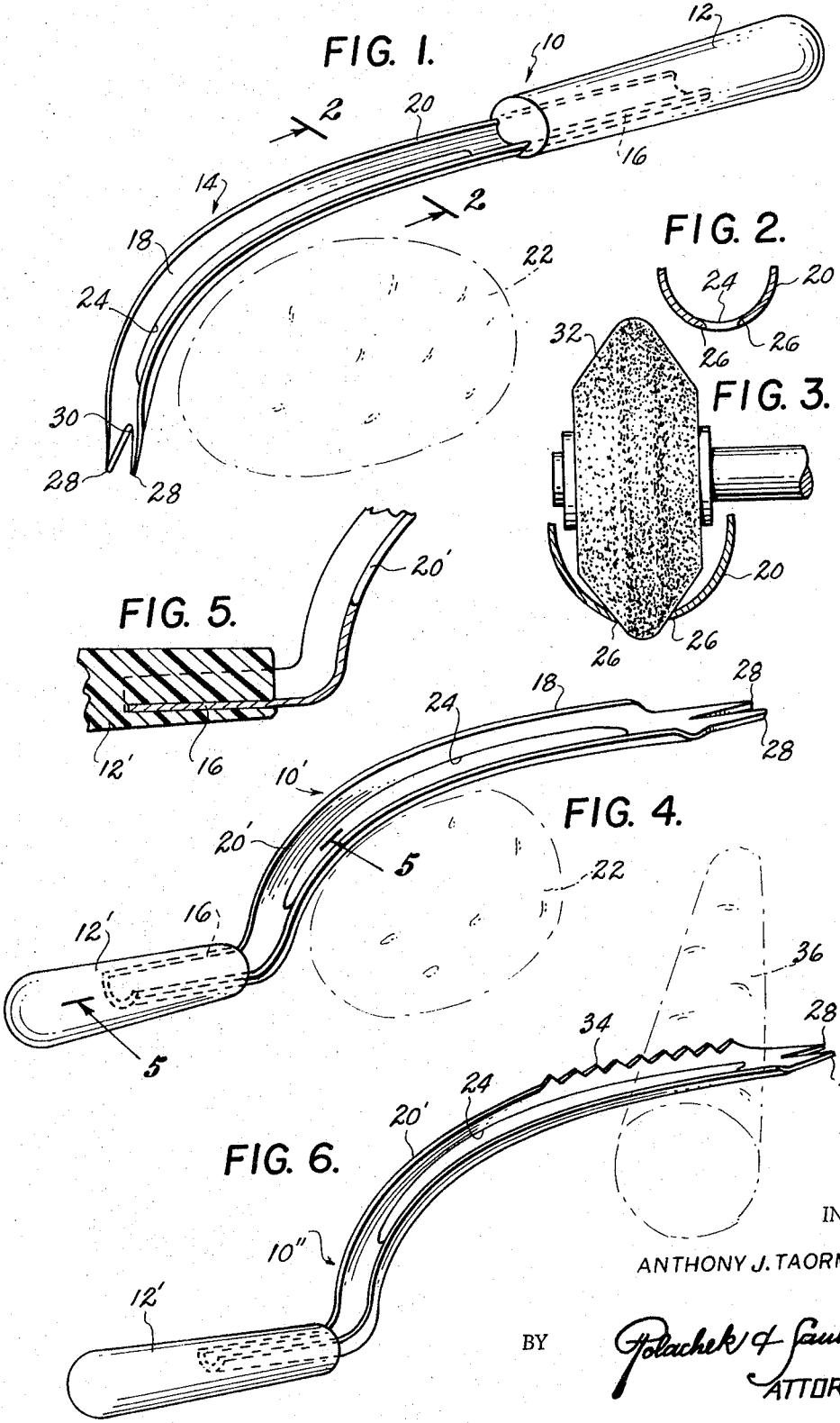

United States Patent Office 3,299,510
Patented Jan. 24, 1967

3,299,510
VEGETABLE AND FRUIT PEELER
Anthony J. Taormina, 578 Seaman Ave.,
Baldwin, Long Island, N.Y. 11510
Filed May 27, 1965, Ser. No. 459,235
2 Claims. (Cl. 30—279)

This invention relates to new and useful improvements in vegetable and fruit peelers and conditioners.

An important object of the present invention is to provide a vegetable peeler including an arcuate shaped body with a pair of blades for peeling vegetables and fruit and with spaced prongs at the end of the body for removing seeds from fruit and the like.

Another object according to a modification of the invention is to provide a vegetable peeler with arcuate shaped blades and with a saw tooth edge for cutting through the rind of fruit.

A further object according to a further modified form of the invention is to provide a vegetable conditioner with a toothed edge for scraping off the skin of vegetables and the like.

Still another object according to a third modification of the invention is to provide a vegetable peeler with a pivotal saw tooth blade for cutting through the rind of a fruit.

Yet another object of the present invention is to provide a vegetable and fruit peeling implement that is simple and practical in construction, strong and reliable in use, efficient and durable in operation, neat and attractive in appearance, inexpensive to manufacture and otherwise well adapted for the purposes for which the same is intended.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a perspective view of a vegetable peeler embodying one form of the invention, the peeler being shown preparatory to peeling a potato, FIG. 2 is cross-sectional view taken on the line 2—2 of FIG. 1, FIG. 3 is a view similar to FIG. 2 on an enlarged scale showing a sharpening device sharpening the cutting edges of the peeler, FIG. 4 is a view similar to FIG. 1 of a vegetable peeler embodying a first modified form of the invention, FIG. 5 is a sectional view taken on the line 5—5 of FIG. 4, FIG. 6 is a view similar to FIG. 1 of a vegetable peeler embodying a second modified form of the invention, FIG. 7 is a view similar to FIG. 1 of a fruit peeler embodying a third modified form of the invention, FIG. 8 is a perspective view of a vegetable peeler embodying a fourth modified form of the invention, FIG. 9 is a similar view of a vegetable peeler embodying a fifth modified form of the invention, a blade being shown in moved position in dash lines, and FIG. 10 is a cross-sectional view taken on the line 10—10 of FIG. 9.

Referring now in detail to the various views of the drawings, in FIG. 1 there is shown a peeler 10 having an elongated cylindrical plastic handle 12 and an elongated metal blade 14. The blade 14 is curved longitudinally for its entire length, with the concave side opening upwardly. One end portion 16 of the body of the blade is straight and is embedded in the handle 12. The other end portion 18 of the body of the blade is curved downwardly and forwardly, the remainder of the body of the blade being straight as indicated at 20. The end portion 18 of the body of the blade constitutes a compound arcuate blade portion and conforms generally to the outer contour of a vegetable such as a potato 22 shown in FIG. 1 and to the outer contour of a fruit such as an orange, grapefruit and other thick skinned fruit.

The body of the blade forwardly of the handle is formed with an elongated closed slot 24 extending substantially the length of said forward portion. The edges of the slot are formed into cutting edges 26, 26. The forward extremity of the body of the blade is provided with two integral prongs 28, 28 that are sharpened in the crotch 30 thereof whereby the seeds of grapefruit or the like may be easily engaged and the fibrous stems of the seeds may be easily severed.

By forming the edges of the slot 24 with cutting edges 26, 26 and by curving the body of the blade forwardly and downwardly a cutting edge 26 may be passed under the skin of the vegetable, such as the potato 22, with the least application of force, extending into the vegetable with an even depth, and the width of the slot 24 allows for the free outwardly and continuous passage of the skin therethrough as the peeling operation proceeds.

The cross-sectional shape of the body of the blade is such that a sharpening wheel such as the emery wheel 32 shown in FIG. 3 may readily engage the knife edges 26, 26 for sharpening the same.

The modified form of peeler 10' shown in FIGS 4 and 5 differs from the peeler 10 merely in that the portion of the blade body 20' adjacent the handle 12' is curved upwardly, longitudinally and transversely and the outer free end portion 18' is substantially straight.

In FIG. 6 a second modified form of the peeler 10" is shown which differs from the form of peeler 10' shown in FIG. 4 in that scraping teeth 34 are formed along one edge of the body adjacent the free end thereof. These teeth 34 facilitate scraping off the skin of a carrot 36 or the like.

The third modified form of peeler 10''' shown in FIG. 7 differs from the peeler 10" of FIG. 6 merely in that deep saw teeth 38 defining a slightly curved peripheral edge are formed on one long edge of the body adjacent the free end thereof. These teeth 38 facilitate cutting through thick skinned fruit such as an orange 40 and the like. In peeler 10''', the junction between the embedded straight portion 16''' of the blade and the adjacent curved portion 20''' is slightly curved or looped as indicated at 42 enhancing the flexibility of the blade and the scraping action thereof.

In FIG. 8, a fourth modified form of peeler 10a is shown comprising an elongated cylindrical plastic handle 12a and an elongated blade 14a with a longitudinally curved body 18a with one end portion 16a embedded in the handle. The body of the blade extends forwardly of the handle 12a with its convex portion opening upwardly and its outer free end 18a curved downwardly conforming generally to the outer contour of certain vegetables and fruits. Spiral slots 44 are cut in the body of the blade at spaced intervals therealong, the edges of said slots being formed into cutting edges 46, 46.

The slots 44 constitute multiple slicers and by pressing downwardly on the blade the edges 46, 46 have a cutting action on the vegetable such as a potato, thereby slicing the potato. Thus with one single pass of the blade over a vegetable, such as a potato, a plurality of slices of uniform width and thickness are cut simultaneously.

Referring now to the fifth modified form of peeler 10x shown in FIGS. 9 and 10, the peeler 10x differs from the peeler 10 of FIG. 1 in that slightly curved separated blade 50 is slidably mounted in the slots 24x of blade 14x. The blade 50 is formed with teeth 52 along one long edge thereof which teeth extend through the slot 24x. The mounting for the blade 50 comprises opposed curved bearing members 54, 54 formed integrally with the top edges of the long edges of the portion 20x of the blade 14x adjacent the handle 12x. Extensions 56 project laterally of one end of the bearings. The blade 50 is formed with an elongated closed slot 58 adjacent the handle 12x, through which projects a pair of pins 60 connecting the bearing members 54, 54 to each other. The blade 50 is adapted to slide along these pins by means of a laterally projecting flange or fingerpiece 62 on the end of blade 50 adjacent the handle, the fingerpiece 62 to hold the blade 50 in operative position.

When it is desired to use the peeler 10x for peeling potatoes and the like, the blade 50 is moved to inoperative position as shown in dash lines in FIG. 9 whereupon the cutting edges 26x, 26x of the slot 24x may be used for peeling purposes. When it is desired to cut the thick rind of a fruit, such as an orange, the blade 50 is swung into the slots 24x with its teeth 52 projecting below the convex side of the body of the blade 14x ready for cutting.

While I have illustrated and described the now preferred embodiments of my invention, it is to be understood that I do not limit myself to the precise constructions herein disclosed and that various changes and modifications may be made within the scope of the invention as defined in the appended claims.

What is claimed is:

1. A potato peeling utensil comprising an elongated cylindrical plastic handle having a blade extending forwardly from one end thereof, the body of the blade having a curved profile and being curved longitudinally providing a concaved side, opening upwardly, said blade having a curved portion adjacent the handle and continuing outwardly to a substantially straight free end portion, said blade having an elongated closed slot forwardly of the curved portion adjacent the handle, inwardly facing sides of said elongated closed slot being sharpened to provide cutting edges on the blade, prongs on said free end portion, and scraping teeth on the top edge of one of the long edges of the blade adjacent the pronged end of the blade.

2. A potato peeling utensil comprising an elongated cylindrical plastic handle having a blade extending forwardly from one end thereof, the body of the blade having a curved profile and being curved longitudinally providing a concaved side, opening upwardly, said blade having a curved portion adjacent the handle and continuing outwardly to a substantially straight free end portion, said blade having an elongated closed slot forwardly of the curved portion adjacent the handle, inwardly facing sides of said elongated closed slot being sharpened to provide cutting edges on the blade, prongs on said free end portion, and saw teeth on the top edge of one of the long edges of the blade adjacent the pronged end of the blade, the outer edges of the teeth defining a slightly curved peripheral edge.

References Cited by the Examiner

UNITED STATES PATENTS

| 919,735 | 4/1909 | Lindsay | 30—279 |
| 1,638,956 | 8/1927 | Pinchbeck et al. | 30—353 X |
| 1,667,596 | 4/1928 | Kapota | 30—279 |
| 2,132,320 | 10/1938 | Quinn | 30—279 |
| 2,178,028 | 10/1939 | Adamec | 30—279 |
| 2,265,504 | 12/1941 | Zimmer | 30—279 |
| 2,520,355 | 8/1950 | Bell | 30—343 X |
| 2,796,099 | 6/1957 | Dierker | 145—52 |

FOREIGN PATENTS 836,176   10/1938   France.

WILLIAM FELDMAN, *Primary Examiner.*

JAMES L. JONES, JR., *Examiner.*